United States Patent [19]
Young et al.

[11] Patent Number: 5,411,653
[45] Date of Patent: May 2, 1995

[54] SEPARATED ELECTRODE SYSTEM IN ELECTROLYTICALLY SETTING OR HARDENING REACTIVE CEMENT PASTES

[75] Inventors: Cameron L. Young, Madison; Dan Y. Eng, Vicksburg; Fred E. Causey, Vicksburg; Philip G. Malone, Vicksburg; William N. Brabston, Vicksburg, all of Miss.

[73] Assignee: The United States of America as represented by the Secretary of the Army, Washington, D.C.

[21] Appl. No.: 238,610

[22] Filed: May 5, 1994

[51] Int. Cl.⁶ .................. C25B 9/00; C25B 15/00; C25D 17/00
[52] U.S. Cl. .................... 204/228; 204/240; 204/267; 204/292; 204/294; 204/252; 204/299 R; 164/250.1
[58] Field of Search ............... 204/267, 240, 235, 238, 204/131, 228, 292, 294, 299 R, 299 EC, 252; 164/250.1

[56] References Cited

U.S. PATENT DOCUMENTS

| | | | |
|---|---|---|---|
| 1,724,954 | 8/1929 | Merritt | 204/238 X |
| 1,885,702 | 11/1932 | Fink | 204/235 X |
| 1,906,914 | 5/1933 | Mason | 204/240 X |
| 3,084,113 | 4/1963 | Vallino | 204/131 |
| 3,431,968 | 3/1969 | Eichenberger | 164/250.1 X |
| 4,619,747 | 10/1986 | Hoadley et al. | 204/182.3 |
| 4,992,641 | 2/1991 | Budin et al. | 204/240 X |
| 5,252,266 | 10/1993 | Brabston et al. | 264/22 |

Primary Examiner—Donald R. Valentine
Attorney, Agent, or Firm—Luther A. Marsh

[57] ABSTRACT

A molding apparatus for hardening, finishing and shaping reactive cement paste by utilizing electrolysis and electrophoresis. The molding apparatus confines a reactive paste in a porous mold, out of direct contact with electrodes. The electrodes are immersed in chambers filled with an electrolyte and are separated from the mold by a filter and perforated support. When a current is applied to the electrodes, the electrolyte decomposes forming a reactive solution that will harden the paste after contact. The filter on the perimeter of the mold, prevents particulates or bubbles, coming from the electrodes, from passing through to the porous mold distorting the hardening paste. In order to uniformly harden a solid or asymmetric shaped section, the movement of the reactive solution through the paste requires that a set of electrodes surrounding the solid or asymmetric section be energized, in pairs, with two electrodes on opposite sides of the configuration, constituting a pair. Each pair receives a direct current for a specific period of time, when the required time is completed, the direction of the current is reversed using a polarity-reversing switch. Upon hardening, the mold imparts the shape and the finish of the inside of the mold onto the reactive paste.

8 Claims, 5 Drawing Sheets

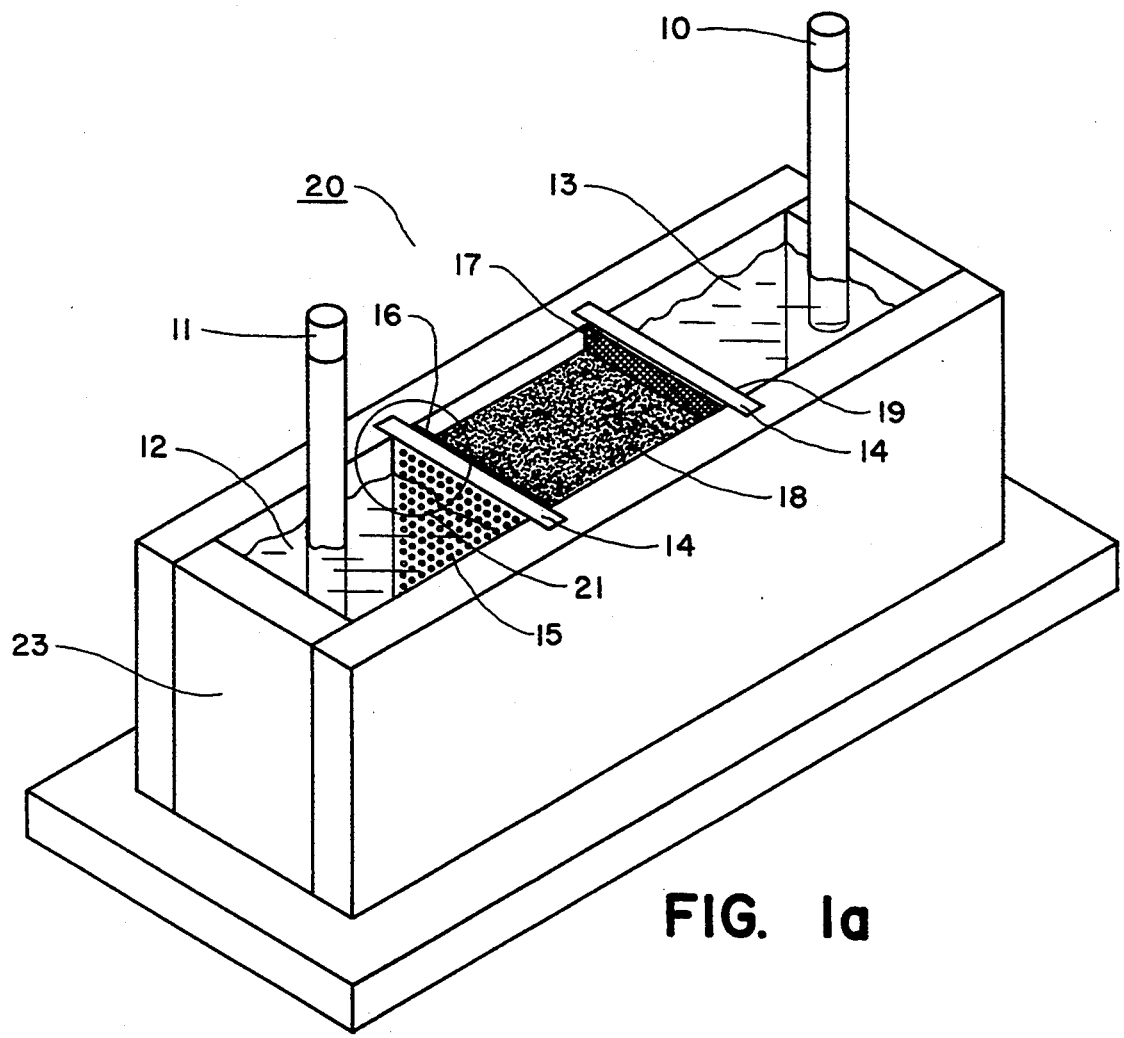
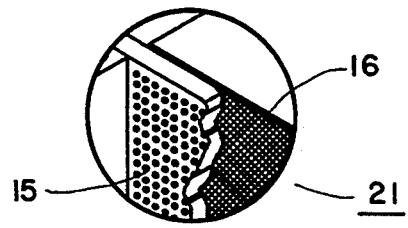
FIG. 1a
FIG. 1b

SEPARATED ELECTRODE SYSTEM IN ELECTROLYTICALLY SETTING OR HARDENING REACTIVE CEMENT PASTES

GOVERNMENT INTEREST STATEMENT

The invention described herein may be manufactured, licensed and used by of for governmental purposes without the payment of any royalties thereon.

BACKGROUND OF THE INVENTION

1. Field of Invention

This invention relates to a molding apparatus for hardening, finishing and shaping cement pastes by electrolysis and electrophoresis. More particularly, it relates to a molding apparatus for electrolytically setting or hardening reactive pastes without requiring contact between the paste and the electrodes. This invention prevents the gases generated in the electrolysis process from escaping and distorting the surface of the paste. The porous mold allows the paste to harden without material splattering from the surface of the electrode to the paste, discoloring the surface of the item being molded.

2. Prior Art

This patent application is related to the U.S. patent application 07/984,617 now abandoned, and U.S. Pat. No. 5,252,266 entitled "Control of the Hardening of Binders and Cements" awarded to the Government on Oct. 12, 1993. The former is a primitive version of the present invention; the latter covers the use of electrolysis to generate the acid or base required to make a suitably prepared paste harden. The paste is formulated to react with the acid or base that is generated by the decomposition of an electrolyte in the paste. However, the patent specifically mentions that the electrodes are placed in contact with the paste. In the present invention, the same paste is used as in U.S. Pat. No. 5,252,266 but the electrodes are not in contact with the paste.

An improved process for controlling the hardening of binder or cement pastes is disclosed in this application. This process utilizes electrolysis to produce the acid or alkali as needed to harden or set the paste in the mold.

SUMMARY OF THE INVENTION

The object of this invention is to harden, finish and shape a reactive cement paste by electrolysis and electrophoresis with fine texture and precision, without void spaces caused by gas bubbles and without solid residues from the electrodes used therein.

In accordance with this invention, the electrodes and the cement paste are physically separated but electrically connected through an electrically conductive aqueous electrolyte solution. Since the electrodes are separated from the paste, no gas bubbles at the electrodes or flaking of electrode material interferes with the setting of the pure paste product.

BRIEF DESCRIPTION OF THE DRAWINGS

FIG. 1a depicts a plan view of the present invention having a cubic mold shape with two porous sides.

FIG. 1b depicts a magnified view of the filter and perforated support in FIG. 1a.

FIG. 4b depicts a magnified view of the filter and perforated support in FIG. 4a.

DETAILED DESCRIPTION OF THE PREFERRED EMBODIMENT

Figure 2:
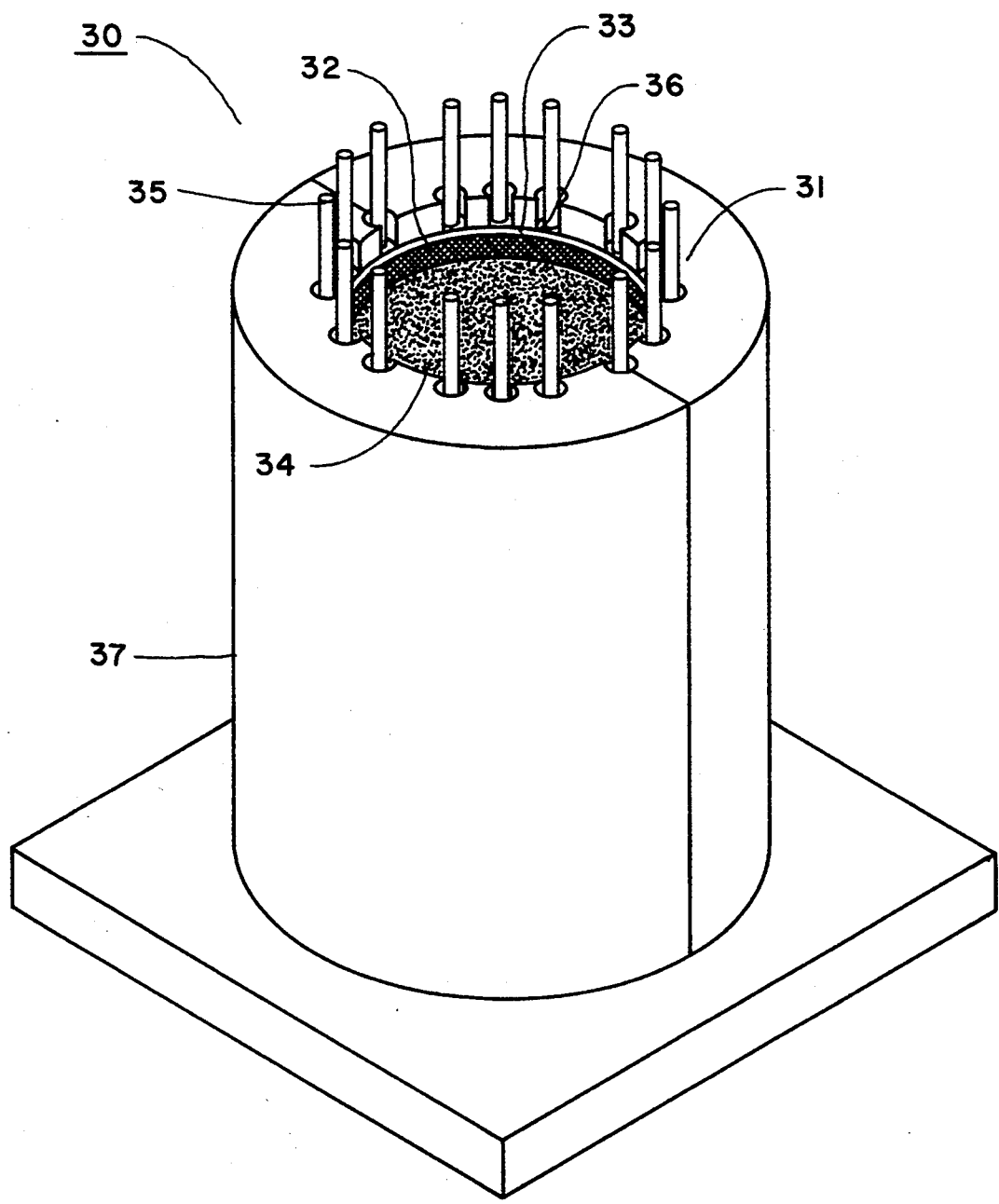
FIG. 2 depicts a plan view of the present invention having a solid cylindrical porous mold with a set of electrodes surrounding the outside of the mold.

The present invention is a molding apparatus for hardening, finishing and shaping a reactive cement paste by electrolysis and electrophoresis. The reactive paste used in this invention is described in U.S. Pat. No. 5,252,266. The molding apparatus of the present invention confines a reactive paste in a porous mold, out of direct contact with the electrodes. The porous mold has a filter on the perimeter of the mold, preventing particulates or bubbles, coming from the electrodes, from passing through to the porous mold and distorting the hardening paste. The pore size of the filter element must be selected so as to retain the paste, but permit the flow of the electrolyte in and out of the paste.

In this invention, the electrodes are immersed in an electrolyte. When an electrical current is applied to the electrode, electrolysis causes the electrolyte to decompose and to undergo a chemical change, forming a different chemical 2solution. This solution is called a reactive solution. The reactive solution will harden the reactive paste after contact.

The reactive solution is first generated on the immersed surface portion of the electrode. As the current continues to flow, the amount of the reactive solution increases and begins to migrate away from the electrode, through the filtered walls of the porous mold, diffuses into the reactive paste, hardening the paste after contact. Any particulate materials flaking or spalling from the electrodes remain in the electrolyte and cannot pass through the porous mold into the hardening paste. This prevents the paste from getting gas-filled voids in it. The reactive solution can be either alkaline or acidic to correspond to whether the reactive paste is alkaline-setting or acid-setting. The motion of the reactive solution through the reactive paste is accelerated by electrophoresis, which is the motion of charged particles through a relatively stationary liquid under the influence of an electric field provided by the immersed electrodes. Thus, the reactive paste hardens more rapidly in this invention than it would if the reactive solution were merely placed in the apparatus instead of the electrolyte, and no electric field was created with the immersed electrodes.

The uniform hardening of the reactive paste is determined by the current flow. Even in the simplest apparatus, it is necessary to control the current in the electrolysis circuit to obtain a properly hardened product. As the paste solidifies, the resistance of the paste increases allowing the temperature to increase. If the temperature rises above about 90 degrees Fahrenheit, the paste may begin to crack. The best way to control the temperature is to decrease the amount of current flowing through the paste and allow the electrolysis to proceed slowly.

Depending on the shape of the object, uniform hardening may be troublesome. A way to combat this problem is to switch the polarity of the electrodes, especially when making an item that is solid or asymmetric. In order to uniformly harden a solid or asymmetric section, the movement of the reactive solution through the paste requires that a set of electrodes surrounding the solid or asymmetric section be energized, in pairs, with two electrodes on opposite sides of the configuration constituting a pair. Each pair receives a direct current for a specific period of time, when the required time is completed, the direction of the current is reversed using a polarity-reversing switch.

If an item is asymmetric, and the wall thicknesses change around the diameter of the object, it is also necessary to control the electrodes in pairs. If a set of electrodes surrounding an asymmetrical section are energized at the same time, the greatest amount of current would flow through the paste at the point where the paste is the thinnest. Operating the electrodes in pairs it easy to control this problem by energizing the electrodes at a thin point for a shorter period of time.

Upon hardening, the mold imparts the shape and the finish of the inside of the mold onto the reactive paste. This invention can be used to make precast beams, concrete culverts, concrete pipes, concrete blocks, and statuary. Typically, samples have been tested after setting for seven days having an unconfined compressive strength of over 2000 psi.

There are four embodiments of the present invention discussed below. These embodiments have different shaped molds to produce distinctly shaped hardened objects.

The first embodiment of this invention utilizes a cubic mold built with two porous sides depicted in FIG. 1. Electrodes 10 and 11 are immersed in electrolytes 13 and 12, respectively. The electrodes 10 and 11 are made from electrically conductive materials selected from the group consisting of carbon, iron, aluminum, copper, zinc, nickel, lead and chromium. A nonporous cast 23, contains the electrolytes 13 and 12. The porous mold 14 is a cubic shape containing a reactive paste 18 therein and having two filters 16 and 17, and two perforated supports 15 and 19. The filters 16 and 17 directly contact the paste 18 preventing spalling from the electrodes from distorting the paste 18 as it hardens. The two filters 16 and 17 are made from either a piece of cellulose filter paper, a microporous polycarbonate sheet, or a ceramic. If, however, the filters 16 and 17 are made from a ceramic, a perforated support will not be necessary. The perforated supports 15 and 19 are made from electrically insulating materials selected from the group consisting of polymer, ceramic or rubber. The nonporous cast 23 containing the electrolytes 13 and 12 is made from electrically insulating materials selected from the group consisting of polymer, ceramic or rubber. The porous mold 14 and the nonporous cast 23 must be made of electrically insulating materials which can withstand the chemical conditions of electrolysis. The porous mold 14 must have a support structure that is strong enough to withstand the pressure from the paste that is placed in the mold without distorting the mold.

In the first embodiment, when the current is applied to electrodes 10 and 11, the electrolytes 13 and 12, respectively, begin to decompose forming a reactive solution. The reactive solution permeates through filters 17 and 16 and perforated supports 19 and 15. After contact the paste 18 hardens.

Figure 4A:
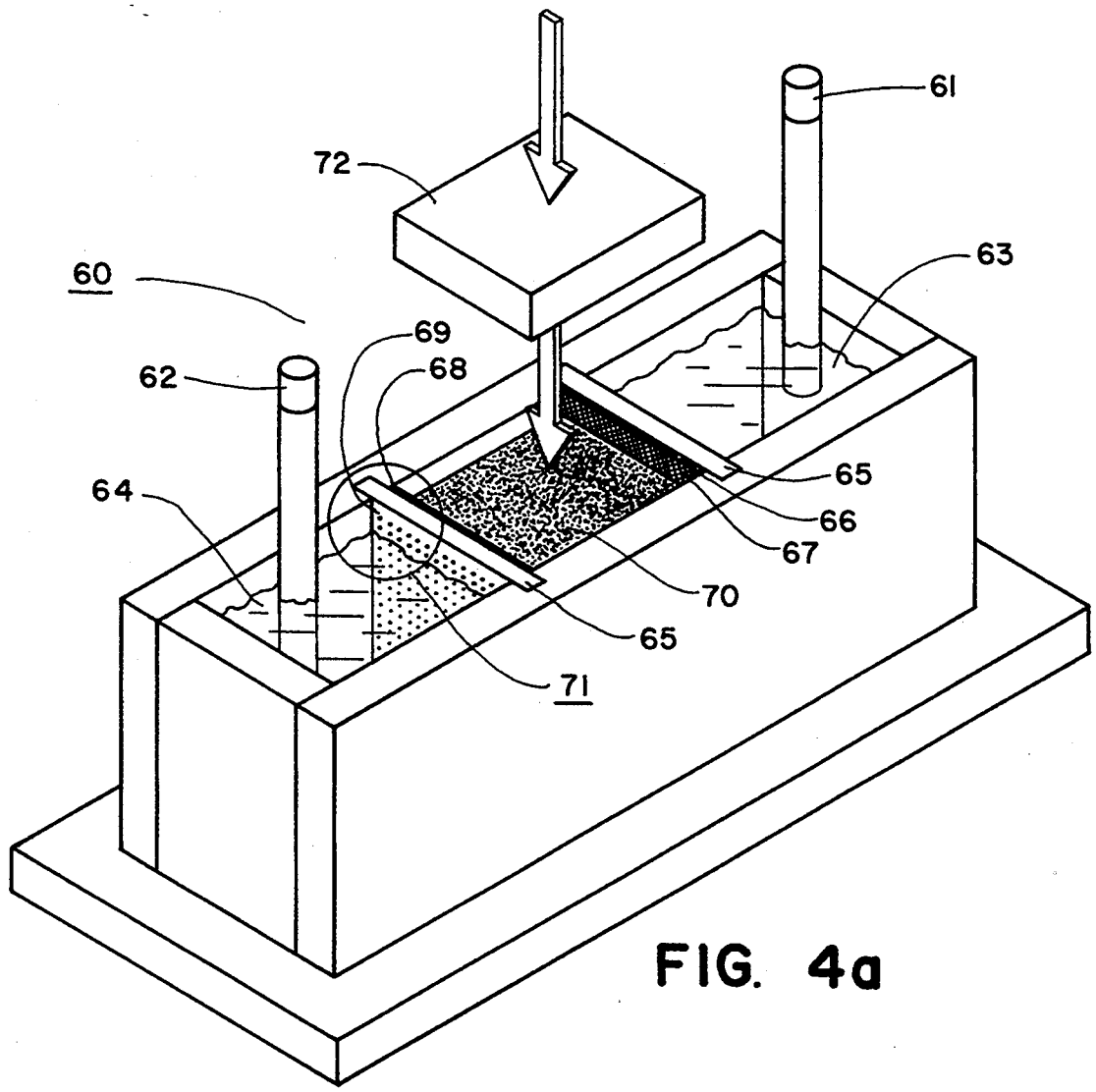
FIG. 4a depicts a plan view of the present invention having a cubic mold shape with two porous sides and a compression piston-like plate.
Figure 4B:
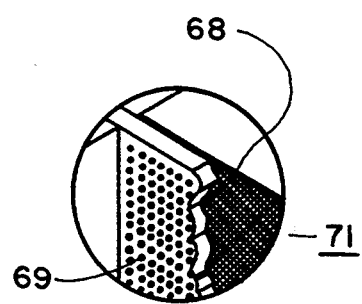

A second embodiment, FIG. 4, works in the same manner and has the identical components of FIG. 1 with the addition of a compression piston-like plate 72. The compression plate 72 compacts the reactive paste 70 and produces a denser hardened product. During compaction, the piston-like plate 72 used with the porous mold permits water to be forced out of the paste 70, reducing the size of the intergranular spaces in the hardened paste 70.

A third embodiment, FIG. 2, is designed to form a solid cylinder. The molding apparatus 30 has a paste 34 held in a cylindrical porous mold 31 with a set of electrodes 35 immersed in an electrolyte 36, surrounding the paste 34. A set of electrodes is defined as one or more electrodes surrounding a portion of a reactive paste. The nonporous cast 37 encloses the electrolyte 36. The filter 32 and perforated support 33 are directly contacting the paste 34, preventing spalling or bubbles from distorting the paste 34 as it hardens.

The set of electrodes 35 are made from electrically conductive materials selected from the group consisting of carbon, iron, aluminum, copper, zinc, nickel, lead and chromium. The filter 32 is selected from the group consisting of a piece of cellulose filter paper, a microporous polycarbonate sheet and a ceramic. If, however, the filter is made from a ceramic, a perforated support will not be necessary. The perforated support 33 is made from electrically insulating materials selected from the group consisting of polymer, ceramic and rubber. The nonporous cast 37 containing the electrolyte is made from electrically insulating materials selected from the group consisting of polymer, ceramic and rubber. The porous mold 31 and the nonporous cast 37 must be made of materials which can withstand the chemical conditions of electrolysis. The porous mold 31 must have a support structure that is strong enough to withstand the pressure from the paste that is placed in the mold without distorting the mold.

In the third embodiment, uniform hardening may be troublesome because the shape of the mold is a solid cylinder. In order to uniformly harden the cylinder, a set of electrodes surrounding the cylinder must be energized, in pairs, with two electrodes on opposite sides of the cylinder. Each pair receives a direct current for a specific period of time, when the required time is completed, the direction of the current is reversed using a polarity-reversing switch.

Figure 5:
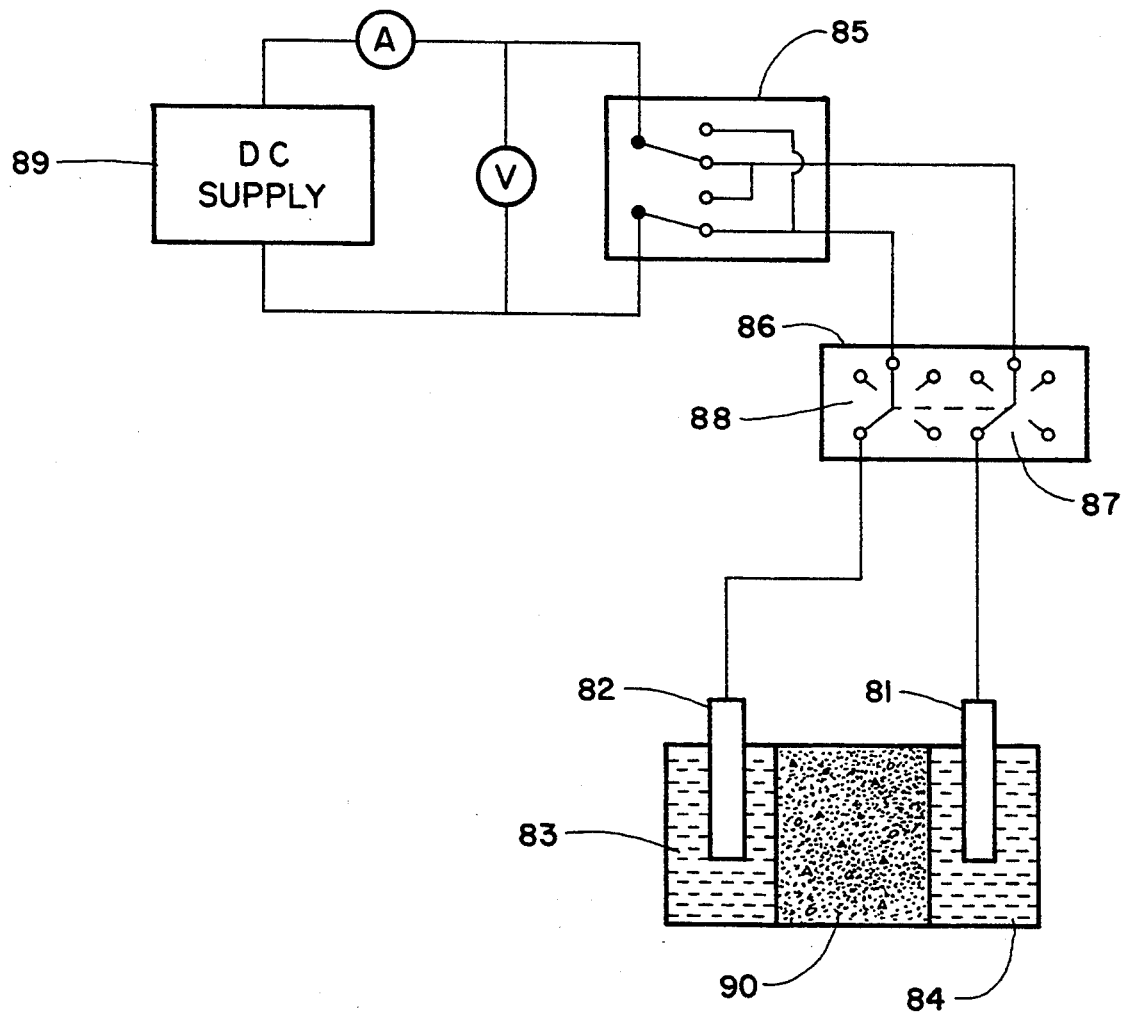
FIG. 5 depicts a schematic view of a polarity-reversing switching circuit to be used with a molding apparatus.

One way to switch the polarity of the electrodes is to pair the electrodes, with two electrodes on opposite sides of the cylinder constituting a pair. For simplicity, FIG. 5 only shows how one pair of electrodes switch polarity. The same configuration can be set up for numerous pairs of electrodes. Two electrodes 81 and 82 are immersed in electrolyte solutions 83 and 84 respectively. An electrode 81 from each of the pairs is attached to a rotary switch plate 87; the oppositely positioned electrode 82 is connected to the corresponding terminal on the second rotary switch plate 88. The rotary switch 86 is in communication with the polarity-reversing switch 85 and the polarity-reversing switch 85 is in communication with the direct current power supply 89. The rotary switch 86 is used to direct the current to each pair of electrodes 81 and 82 for a specific period of time. When all pairs of electrodes have been successively energized for the required period of time, the direction of the current is reversed using the polarity-reversing switch 85.

Figure 3:
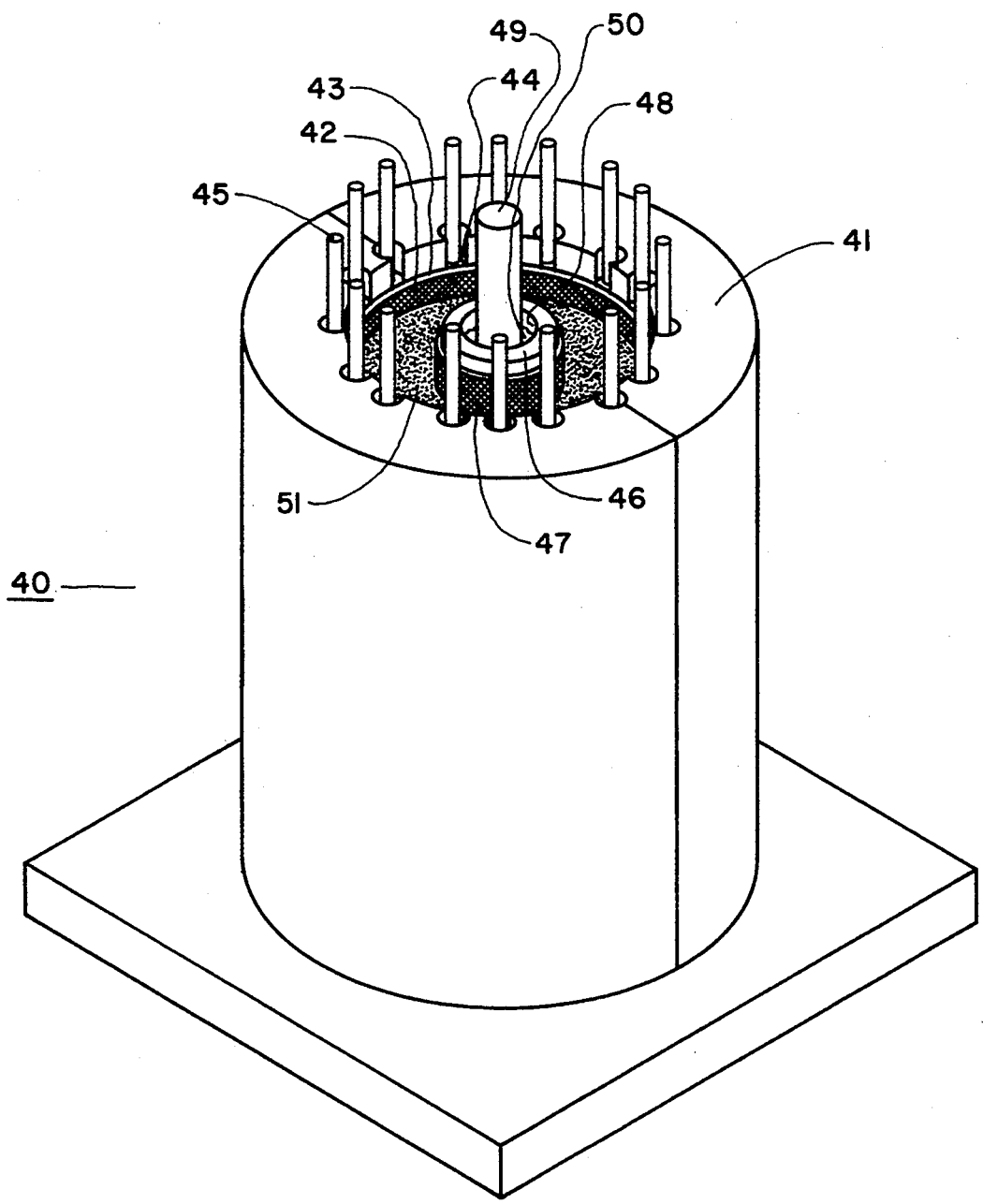
FIG. 3 depicts a plan view of the present invention having a hollow cylindrical porous mold with a set of electrodes surrounding the outside of the mold and a second set of electrodes on the inside hollow core of the mold.

A fourth embodiment of the invention, FIG. 3, is designed to form a hollow cylinder. This embodiment is similar to the configuration in the third embodiment but has a second set of electrodes. The molding apparatus 40 has a paste 51 held in a cylindrical porous mold 41 with a first set of electrodes 45 immersed in an electrolyte 44, surrounding the paste 51. A set of electrodes is defined as one or more electrodes surrounding a portion of a reactive paste. A second set of electrodes 49 is positioned inside a filter 47 and a perforated support 48 holding a second electrolyte therein. The hardening of the paste in the porous mold 41 is produced by passing current between the outer set of electrodes 45 and the inner set of electrodes 49.

The hardening of the paste in the fourth embodiment is produced by passing a current between the outer set of electrodes 45 and the inner set of electrodes 49.

The present invention can be used to make other shapes than those disclosed in the four embodiments above. While this invention has been described as having a preferred design, it is understood that it is capable of further modifications, uses, and/or adaptations, it will be apparent to those of ordinary skill in the art that various changes and modifications may be made without deviating from the inventive concepts as set forth above.

What is claimed is:

1. A molding apparatus for hardening, finishing and shaping reactive cement paste by electrolysis and electrophoresis comprising:

a porous mold having a filter and a nonporous cast, yielding a chamber;

said chamber being strong enough to support and shape a reactive paste contained therein;

said nonporous cast being adapted for containing an electrolyte;

a plurality of electrodes adapted for immersion in said electrolyte and said electrodes adapted to be positioned separate and out of contact with said reactive paste when in said chamber;

said electrodes provide electrical contact with said reactive paste as an electric current passes through said porous mold via said electrodes and said electrolyte causing said paste to harden, and said porous mold shaping and imparting a finish onto said reactive paste upon hardening.

2. The molding apparatus of claim 1, wherein said filter is selected from the group consisting of a piece filter paper, a microporous polycarbonate sheet, and a ceramic, with a proviso that said filter paper and said microporous polycarbonate sheet need a perforated support.

3. The molding apparatus of claim 2, wherein said perforated support is made from an electrically insulating material selected from the group consisting of polymer, ceramic and rubber.

4. The molding apparatus of claim 1, wherein said nonporous cast is made from an electrically insulating material selected from the group consisting of polymer, ceramic and rubber.

5. The molding apparatus of claim 1, wherein said electrodes are made of electrically conductive materials selected from the group consisting of carbon, iron, aluminum, copper, zinc, nickel, lead and chromium.

6. The molding apparatus of claim 1, wherein electrodes consist of two sets, a first set positioned opposite a second set.

7. The molding apparatus of claim 1, further comprising a compression plate positioned over said paste and compacting said paste as required.

8. The molding apparatus of claim 1, further comprising a switching means for alternating the flow of said current between a pair of electrodes, said pair positioned opposite one another, for varying intervals of time as is required for uniformly hardening said paste.

* * * * *